US012587461B2

(12) United States Patent
Imou et al.

(10) Patent No.: US 12,587,461 B2
(45) Date of Patent: Mar. 24, 2026

(54) IN-VEHICLE COMMUNICATION SYSTEM AND TRANSMISSION PATH EVALUATION METHOD

(71) Applicant: HONDA MOTOR CO., LTD., Tokyo (JP)

(72) Inventors: Takeshi Imou, Tokyo (JP); Takumi Nomura, Tokyo (JP); Hiroshi Morishita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 396 days.

(21) Appl. No.: 18/162,018

(22) Filed: Jan. 31, 2023

(65) Prior Publication Data

US 2023/0269162 A1     Aug. 24, 2023

(30) Foreign Application Priority Data

Feb. 18, 2022     (JP) ................................. 2022-023613

(51) Int. Cl.
| *H04L 43/12* | (2022.01) |
| *H04L 12/44* | (2006.01) |
| *H04L 43/08* | (2022.01) |

(52) U.S. Cl.
CPC .............. *H04L 43/12* (2013.01); *H04L 12/44* (2013.01); *H04L 43/08* (2013.01)

(58) Field of Classification Search
CPC ......... H04L 43/12; H04L 12/44; H04L 43/08; H04L 12/40; H04L 43/50; H04L 2012/40273; H04L 67/12
See application file for complete search history.

(56) References Cited

U.S. PATENT DOCUMENTS

| 2008/0095286 A1 | 4/2008 | Lieuwen |
| 2011/0242989 A1 | 10/2011 | Kim |
| | | (Continued) |

FOREIGN PATENT DOCUMENTS

| CN | 1985521 A | 6/2007 |
| CN | 103222310 A | 7/2013 |
| | (Continued) | |

OTHER PUBLICATIONS

Japanese Office Action dated Sep. 26, 2023, Application No. 2022-023613; English machine translation included, 8 pages.
(Continued)

*Primary Examiner* — Schquita D Goodwin
(74) *Attorney, Agent, or Firm* — Rankin, Hill & Clark LLP

(57) ABSTRACT

An in-vehicle communication system includes communication transmission paths, a first electronic device and second electronic devices each of which is connected directly/indirectly with the first electronic device through the communication transmission path(s), the first electronic device includes an evaluation unit sending a predetermined evaluation signal to the second electronic device(s) as target device(s), receiving a reply signal sent back by the target device in response to the evaluation signal, and evaluating a transmission quality of the communication transmission path(s), each of the second electronic devices includes a first communicator folding back a propagation direction of the evaluated signal received as the target device and sending the evaluated signal as the reply signal to the first electronic device, and the evaluation unit stores an evaluation result about the transmission quality, in association with the second electronic device that is the target device.

7 Claims, 4 Drawing Sheets

(56) References Cited

U.S. PATENT DOCUMENTS

| | | | |
|---|---|---|---|
| 2013/0244683 A1 | 9/2013 | Fukumasa et al. | |
| 2013/0329646 A1 | 12/2013 | Fukumoto et al. | |
| 2018/0062988 A1* | 3/2018 | Sikaria | H04L 12/4633 |
| 2018/0267548 A1 | 9/2018 | Sumioka | |
| 2019/0306729 A1* | 10/2019 | Lopes | H04L 67/125 |
| 2020/0280831 A1* | 9/2020 | Booij | H04L 65/80 |
| 2020/0386556 A1* | 12/2020 | Rolf | G01C 21/3679 |
| 2020/0393532 A1* | 12/2020 | Chae | G01S 5/0249 |
| 2022/0303305 A1* | 9/2022 | Shin | H04L 63/1416 |
| 2023/0022272 A1* | 1/2023 | Sakurazawa | H04B 3/46 |
| 2023/0353446 A1* | 11/2023 | Ichimaru | H04L 43/08 |
| 2025/0106607 A1* | 3/2025 | Ichimaru | H04B 3/04 |

FOREIGN PATENT DOCUMENTS

| | | | |
|---|---|---|---|
| CN | 103229532 A | 7/2013 |
| CN | 108628300 A | 10/2018 |
| JP | 2012-507944 A | 3/2012 |
| JP | 2014-49916 A | 3/2014 |
| JP | 2014-517568 A | 7/2014 |
| JP | 2015-046869 A | 3/2015 |
| JP | 2018-182607 A | 11/2018 |
| JP | 2020-111078 A | 7/2020 |
| WO | 2010/051221 A1 | 5/2010 |

OTHER PUBLICATIONS

Chinese Office Action dated Jul. 31, 2025 issued in corresponding Chinese application No. 202310093999.8; English machine translation included (14 pages).

* cited by examiner

Figure 3:
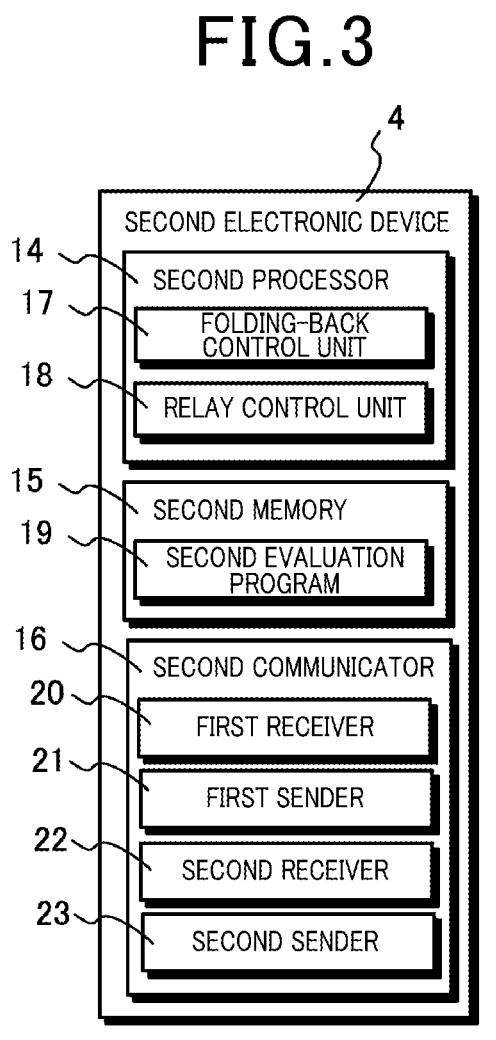

SECOND ELECTRONIC DEVICE

14    SECOND PROCESSOR

17    FOLDING-BACK CONTROL UNIT

18    RELAY CONTROL UNIT

15    SECOND MEMORY

19    SECOND EVALUATION PROGRAM

16    SECOND COMMUNICATOR

20    FIRST RECEIVER

21    FIRST SENDER

22    SECOND RECEIVER

23    SECOND SENDER

IN-VEHICLE COMMUNICATION SYSTEM AND TRANSMISSION PATH EVALUATION METHOD

INCORPORATION BY REFERENCE

The present application claims priority under 35 U.S.C. § 119 to Japanese Patent Application No. 2022-023613 filed on Feb. 18, 2022. The content of the application is incorporated herein by reference in its entirety.

BACKGROUND OF THE INVENTION

Field of the Invention

The present invention relates to an in-vehicle communication system and a transmission path evaluation method, which are capable of evaluating a transmission path connecting electronic devices that are equipped in a vehicle.

Description of the Related Art

Japanese Patent Laid-Open No. 2018-182607 discloses a mobile terminal that evaluates transmission qualities of the uplink and downlink by communicating with a stationary terminal through a communication network. The mobile terminal sends a reference signal to the stationary terminal to acquire an evaluation result about the transmission quality of the uplink from the stationary terminal, and evaluates the transmission quality of the downlink by comparing a reference signal received from the stationary terminal and a reference signal for collation. Further, the mobile terminal stores the evaluation results about the transmission qualities of the uplink and the downlink, in association with information about the current position.

Japanese Patent Laid-Open No. 2015-46869 discloses a sending device of a vehicle interior communication system in which when a communication delay time for a first communication method in a first communication unit exceeds a predetermined criterion, a second communication unit performs communication by a second communication method in which a communication period and a communication time are restricted. In the sending device, for example, the communication delay time is defined as a time after a sending instruction for communication data is sent to the first communication unit and before the first communication unit receives a response from a receiving device.

A communication network of an in-vehicle communication system formed from a plurality of electronic control devices can be configured to include various network topologies such as a star type, a ring type, and a bus type. In the case of checking the transmission quality, abnormal state or the like of each transmission path joining the electronic control devices in such communication network, it is inefficient to individually execute the communication for the diagnosis as in the above related art for all pair combinations of two electronic control devices included in the in-vehicle communication system.

An object of the present invention is to efficiently evaluate the transmission quality of a plurality of communication transmission paths constituting the communication network in the in-vehicle communication system, without individually performing the diagnosis communication for each communication transmission path.

SUMMARY OF THE INVENTION

An aspect of the present invention is an in-vehicle communication system including a plurality of communication transmission paths equipped in a vehicle, a first electronic device, and a plurality of second electronic devices communicably connected with the first electronic device by the communication transmission paths, in which: each of the second electronic devices is communicably connected directly with the first electronic device by one of the communication transmission paths, or is communicably connected indirectly with the first electronic device through some of the communication transmission paths and another of the second electronic devices; the first electronic device includes an evaluation unit configured to send a predetermined evaluation signal to a target device, to receive a reply signal, and to evaluate a transmission quality of one or some of the communication transmission paths, the target device being one of the second electronic devices, the reply signal being sent back by the target device in response to receipt of the evaluation signal, the one or some of the communication transmission paths being provided from the first electronic device to the target device; each of the second electronic devices includes a communicator configured to fold back a propagation direction of the evaluated signal received as the target device and send the evaluated signal as the reply signal to the first electronic device; and the evaluation unit of the first electronic device stores an evaluation result about the transmission quality, in association with the second electronic device that is the target device.

In another aspect of the present invention, the evaluation signal is formed from an array of a predetermined number of test signals, and the evaluation unit stores the number of the test signals included in the evaluation signal and the number of the test signals included in the reply signal, as the evaluation result about the transmission quality.

In another aspect of the present invention, the communication transmission paths, the first electronic device and the plurality of second electronic devices constitute a communication network, the first electronic device and the plurality of second electronic devices being connected with each other by the communication transmission paths, and the evaluation unit of the first electronic device evaluates the transmission quality along a communication route from the first electronic device to the second electronic device at an end of the communication network, while sequentially adopting, as the target device, each second electronic device from the second electronic device at the end to the second electronic device closest to the first electronic device.

In another aspect of the present invention, the communicator of each of the second electronic devices relays the evaluation signal sent for another of the second electronic devices, to send the evaluation signal to the other of the second electronic devices, and relays the reply signal from the other of the second electronic devices, to send the reply signal to the first electronic device, the other of the second electronic devices being the target device.

In another aspect of the present invention, the first electronic device and the plurality of second electronic devices form a tree structure in which the first electronic device is a root, in which each of the second electronic devices is a node or a leaf, and in which each of the communication transmission paths is a branch, and the evaluation unit of the first electronic device evaluates the transmission quality, from the second electronic device that is the leaf, along the communication transmission path that is the branch, while sequentially adopting, as the target device, the second electronic device that is the node closer to the first electronic device.

In another aspect of the present invention, the evaluation unit of the first electronic device evaluates the transmission quality both when a drive device of the vehicle is in an on-state and when the drive device of the vehicle is in an off-state, and stores evaluations of the transmission quality both in the on-state and in the off-state.

Another aspect of the present invention is a transmission path evaluation method in an in-vehicle communication system including a plurality of communication transmission paths equipped in a vehicle, a first electronic device, and a plurality of second electronic devices communicably connected with the first electronic device by the communication transmission paths, in which: each of the second electronic devices is communicably connected directly with the first electronic device by one of the communication transmission paths, or is communicably connected indirectly with the first electronic device through some of the communication transmission paths and another of the second electronic devices; and the transmission path evaluation method includes a step of sending, by an evaluation unit of the first electronic device, a predetermined evaluation signal to a target device that is one of the second electronic devices, a step of receiving, by a communicator of the second electronic device that is the target device, the evaluation signal from the first electronic device, and folding back a propagation direction of the evaluated signal and sending the evaluated signal back as a reply signal to the first electronic device, a step of receiving, by the evaluation unit of the first electronic device, the reply signal sent back by the second electronic device that is the target device, and evaluating a transmission quality of one or some of the communication transmission paths, the one or some of the communication transmission paths being provided from the first electronic device to the target device, and a step of storing, by the evaluation unit of the first electronic device, an evaluation result about the transmission quality, in association with the second electronic device that is the target device.

In another aspect of the present invention, the evaluation signal is formed from an array of a predetermined number of test signals, and in the step of storing, the evaluation unit stores the number of the test signals included in the evaluation signal and the number of the test signals included in the reply signal, as the evaluation result about the transmission quality.

According to one aspect of the present invention, it is possible to efficiently evaluate the transmission quality of a plurality of communication transmission paths constituting the communication network in the in-vehicle communication system, without individually performing the diagnosis communication for each communication transmission path.

BRIEF DESCRIPTION OF THE DRAWINGS

FIG. 3 is a diagram showing the configuration of a second electronic device.

DETAILED DESCRIPTION OF THE PREFERRED EMBODIMENT

An embodiment of the present invention will be described below with reference to the drawings.

Figure 1:
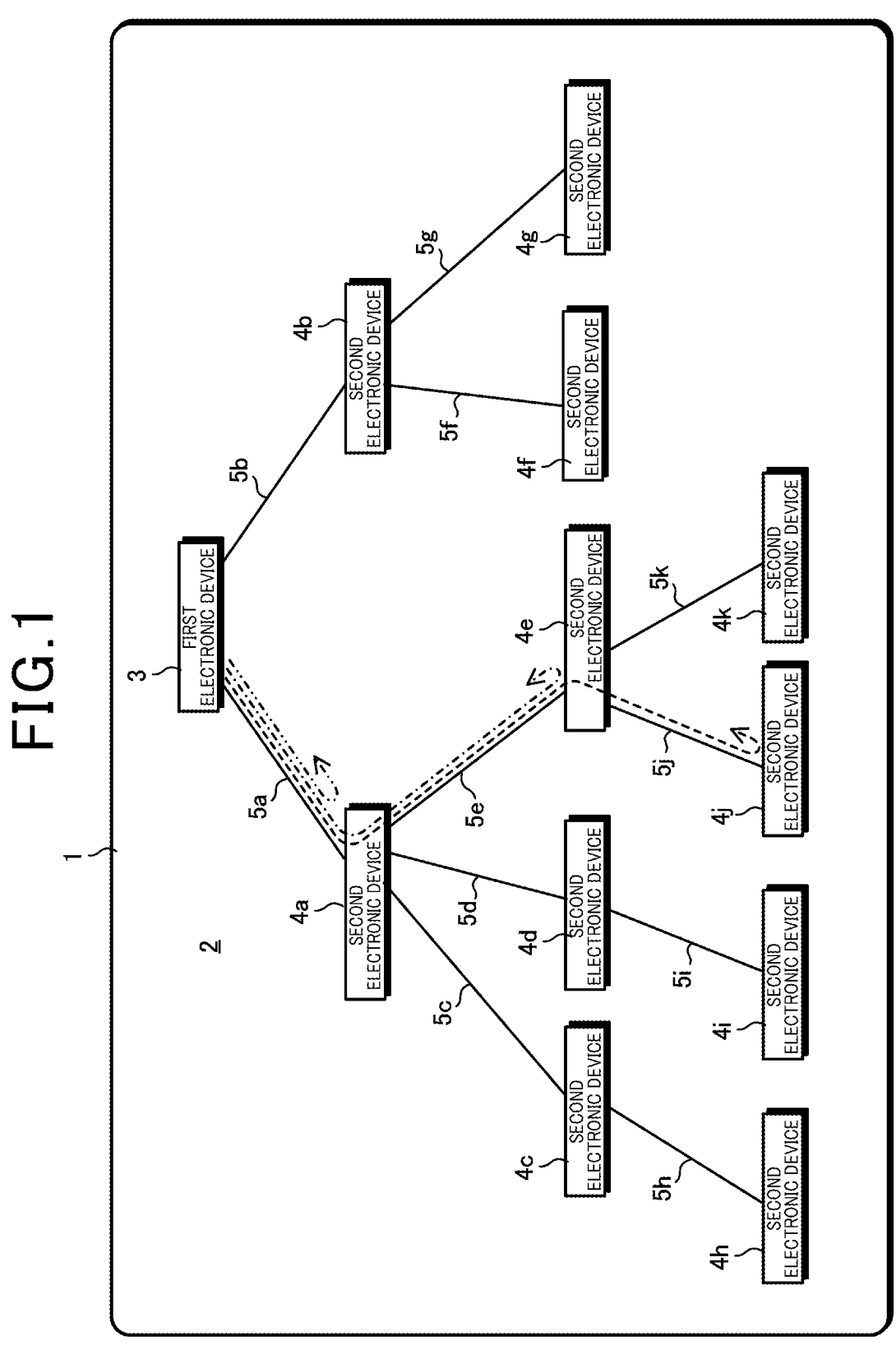
FIG. 1 is a diagram showing the configuration of an in-vehicle communication system according to an embodiment of the present invention.

FIG. 1 is a diagram showing the configuration of an in-vehicle communication system 2 equipped in a vehicle 1 according to the embodiment of the present invention. The in-vehicle communication system 2 includes a first electronic device 3 and a plurality of second electronic devices 4a, 4b, 4c, 4d, 4e, 4f, 4g, 4 h, 41, 4j, 4k each of which is an electronic control device that controls the operation of the vehicle 1. Hereinafter, the second electronic devices 4a, 4b, 4c, 4d, 4e, 4f, 4g, 4 h, 4i, 4j, 4k are collectively referred to as a second electronic device 4.

Further, the in-vehicle communication system 2 includes a plurality of communication transmission paths 5a, 5b, 5c, 5d, 5e, 5f, 5g, 5 h, 5i, 5j, 5k. Hereinafter, the communication transmission paths 5a, 5b, 5c, 5d, 5e, 5f, 5g, 5 h, 5i, 5j, 5k are collectively referred to as a communication transmission path 5.

The communication transmission paths 5, and the first electronic device 3 and the plurality of second electronic devices 4 that are connected with each other by the respective communication transmission paths 5 constitute a communication network as a whole. In the embodiment, as shown in FIG. 1, the communication network has a tree structure in which the first electronic device 3 is a root, in which each of the second electronic devices 4 is a node or a leaf, and in which each of the communication transmission paths 5 is a branch.

Specifically, the respective second electronic devices 4a, 4b, 4c, 4d, 4e, 4f, 4g each of which is sandwiched by two second electronic devices 4 through communication transmission paths 5 constitute nodes of the tree structure in the above communication network. Further, the respective second electronic devices 4h, 4i, 4j, 4k each of which is joined with only one second electronic device 4 are leaves of the above tree structure, and are positioned at ends of the above communication network.

Each of the second electronic devices 4 is communicably connected directly with the first electronic device 3 by the communication transmission path 5, or is communicably connected indirectly with the first electronic device 3 through the communication transmission path 5 and another second electronic device 4. In the embodiment, specifically, the second electronic devices 4a and 4b are communicably connected directly with the first electronic device 3 through the communication transmission paths 5a and 5b, respectively. Further, each second electronic device 4 of the second electronic devices 4c to 4k is communicably connected indirectly with the first electronic device 3 through the communication transmission path 5 and another second electronic device 4.

Figure 2:
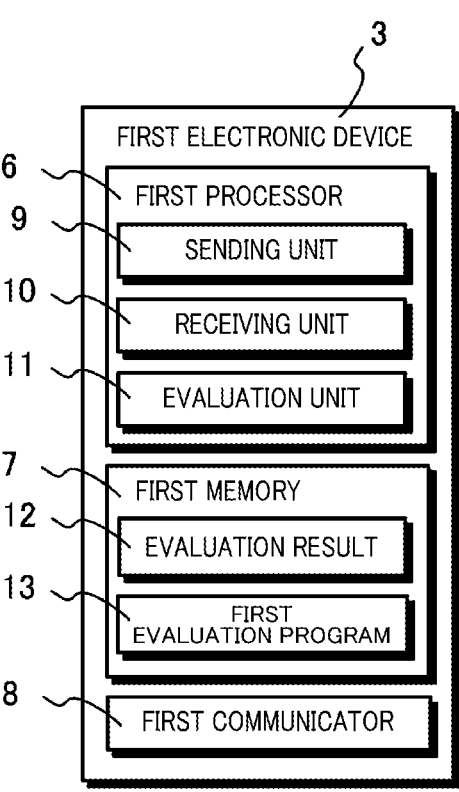
FIG. 2 is a diagram showing the configuration of a first electronic device.

FIG. 2 is a diagram showing the configuration of the first electronic device 3. The first electronic device 3 includes a first processor 6, a first memory 7 and a first communicator 8. For example, the first memory 7 is formed from a volatile semiconductor memory and/or a non-volatile semiconductor memory. The first communicator 8 is a transceiver (transmitter/receiver, circuit) by which the first electronic device 3 communicates with the second electronic device 4 through the communication transmission path 5.

For example, the first processor 6 is a computer that includes a CPU (Central Processing Unit) and the like. The first processor 6 may be configured to include a ROM (Read Only Memory) in which programs are written, a RAM (Random Access Memory) for temporary storage of data, and the like. The first processor 6 includes a sending unit 9, a receiving unit 10 and an evaluation unit 11, as functional elements or functional units.

For example, these functional elements included in the first processor 6 are realized when the first processor 6 that is a computer executes a first evaluation program 13 stored in the first memory 7. The first evaluation program 13 can be stored in an arbitrary computer-readable storage medium. Instead, all or some of the above functional elements included in the first processor 6 may be formed from hardware devices each of which includes one or more electronic circuit components.

By an instruction from the evaluation unit 11, the sending unit 9 designates one of the second electronic devices 4 as a sending destination, and sends an evaluation signal, using the first communicator 8. For example, the sending unit 9 sends the above evaluation signal to a second electronic device 4 that is the sending destination, after sending an evaluation sending notice indicating that the second electronic device 4 is the sending destination of the evaluation signal.

The receiving unit 10 receives, through the first communicator 8, a reply signal that is sent back from the second electronic device 4 designated as the above sending destination, and sends the reply signal to the evaluation unit 11.

The evaluation unit 11 evaluates the transmission quality for communication signals on each of the communication transmission paths 5. Specifically, the evaluation unit 11 decides one of the second electronic devices 4 as a target device. The evaluation unit 11 designates the above target device as a receiving destination, and sends a predetermined evaluation signal, through the sending unit 9. Thereafter, through the receiving unit 10, the evaluation unit 11 receives the replay signal, which is sent back by the second electronic device 4 that is the target device in response to the receipt of the above evaluation signal.

Then, the evaluation unit 11 compares the above sent evaluation signal and the above received reply signal, and thereby, evaluates the transmission quality of the communication transmission path 5 from the first electronic device 3 to the second electronic device 4 that is the above target device. The evaluation unit 11 stores an evaluation result 12 indicating a result of the above evaluation, in the first memory 7, in association with the second electronic device 4 that is the above target device.

For example, the above evaluation signal is formed from an array of a predetermined number of test signals. As the evaluation result 12 about the above transmission quality, the evaluation unit 11 stores the number m of test signals included in the evaluation signal and the number n of test signals included in the reply signal, in the first memory 7, in association with the second electronic device 4 that is the above target device. For example, the test signal can be a signal expressing a predetermined code (for example, a character code) that is previously set.

In the embodiment, particularly, the evaluation unit 11 evaluates the above transmission quality along a communication route from the first electronic device 3 to the second electronic device 4 at an end of the communication network, while sequentially adopting, as the target device, each second electronic device from the second electronic device 4 at the end to the second electronic device 4 closest to the first electronic device 3.

Specifically, in the embodiment, the evaluation unit 11 evaluates the above transmission quality, from the second electronic device 4 that is the leaf in the above communication network having a tree structure, along the communication transmission path 5 that is the branch, while sequentially deciding, as the target device, the second electronic device 4 that is the node closer to the first electronic device 3.

For example, in FIG. 1, along a communication route that reaches the second electronic device 4*j* at the end by passing through the first electronic device 3, the communication transmission path 5*a*, the second electronic device 4*a*, the communication transmission path 5*e* and the second electronic device 4*e* in order, the evaluation unit 11 first adopts the second electronic device 4*j* at the end, as the target device, to evaluate the transmission quality. In FIG. 1, a propagation pathway for the evaluation signal at this time is illustrated by a dotted line. Subsequently, the evaluation unit 11 sequentially adopts, as the target device, the second electronic devices 4*e* and 4*a* closer to the first electronic device 3, along the above communication route, to evaluate the transmission quality. In FIG. 1, propagation pathways for the evaluation signal at the time of these evaluations are shown by a one-dot chain line and a two-dot chain line, respectively.

Thereby, it is possible to easily determine whether the transmission quality of each communication transmission paths 5 included in the communication route is high or low, by comparing the evaluation results about the transmission quality that are sequentially obtained as described above, to each other.

Further, the evaluation unit 11 evaluates the above transmission quality both when a drive device (not illustrated) of the vehicle 1 is in an on-state and when the drive device of the vehicle 1 is in an off-state, and stores, in the first memory 7, the evaluation result 12 indicating evaluations of the above transmission quality both in the above on-state and in the above off-state. For example, the drive device is an internal combustion engine or motor that drives wheels of the vehicle 1.

Thereby, it is possible to easily and efficiently know the influence that is given on the transmission quality of the communication transmission path 5 by the drive device, which can be a principal noise source in the vehicle 1.

FIG. 3 is a diagram showing the configuration of the second electronic device 4. The second electronic device 4 includes a second processor 14, a second memory 15 and a second communicator 16. For example, the second memory 15 is formed from a volatile semiconductor memory and/or a non-volatile semiconductor memory. The second communicator 16 is a transceiver (transmitter/receiver, circuit) by which the second electronic device 4 communicates with the first electronic device 3 and another second electronic device 4 through the communication transmission path 5. In the embodiment, the second communicator 16 includes a first receiver 20, a first sender 21, a second receiver 22 and a second sender 23.

The first receiver 20 and the first sender 21 are a receiver and sender for performing communication through the communication transmission path 5 connected from the direction of the first electronic device 3. For example, "the communication transmission path 5 connected from the direction of the first electronic device 3" means the communication transmission path 5*d* connected from the direction of the first electronic device 3, in the case of the second electronic device 4*d*, and means the communication transmission path 5*e* connected from the direction of the first electronic device 3, in the case of the second electronic device 4*e*.

Further, the second receiver 22 and the second sender 23 are a receiver and sender for performing communication through the communication transmission path 5 connected from the opposite direction of the direction of the first electronic device 3. For example, "the communication transmission path 5 connected from the opposite direction of the direction of the first electronic device 3" means the communication transmission path 5*i* connected from the opposite direction of the direction of the first electronic device 3, in the case of the second electronic device 4*d*, and means the communication transmission paths 5*j* and 5*k* connected from the opposite direction of the direction of the first electronic device 3, in the case of the second electronic device 4*e*. In the case where there is a plurality of communication transmission paths 5 connected from the opposite direction of the direction of the first electronic device 3 as in the case of the second electronic device 4*e*, the second receiver 22 and the second sender 23 may include at least the same number of receivers and senders as the number of the connected communication transmission paths 5, respectively, in accordance with the related art.

For example, the second processor 14 is a computer that includes a CPU and the like. The first processor 6 may be configured to include a ROM in which programs are written, a RAM for temporary storage of data, and the like. The second processor 14 includes a folding-back control unit 17 and a relay control unit 18, as functional elements or functional units.

For example, these functional elements included in the second processor 14 are realized when the second processor 14 that is a computer executes a second evaluation program 19 stored in the second memory 15. The second evaluation program 19 can be stored in an arbitrary computer-readable storage medium. Instead, all or some of the above functional elements included in the second processor 14 may be formed from hardware devices each of which includes one or more electronic circuit components.

When the folding-back control unit 17 receives the evaluation sending notice from the first electronic device 3 to its device through the first receiver 20 of the second communicator 16, the folding-back control unit 17 sets the second communicator 16 to a folding-back operation mode. The folding-back operation mode is an operation mode in which the evaluation signal that is received after the evaluation sending notice is received is send back to the first electronic device 3 with the propagation direction thereof being folded back. The second communicator 16 set to the folding-back operation mode corresponds to "a communicator configured to fold back a propagation direction of the evaluated signal received as the target device and send the evaluated signal as the reply signal to the first electronic device" in the present disclosure.

In the embodiment, for example, when the folding-back control unit 17 receives the evaluation sending notice, the folding-back control unit 17 instructs the second communicator 16 to connect the output of the first receiver 20 to the input of the first sender 21, and thereby, sets the second communicator 16 to the folding-back operation mode. Further, when the folding-back sending of the evaluation signal by the first receiver 20 and the first sender 21 ends, the folding-back control unit 17 instructs the second communicator 16 to terminate the folding-back operation mode, and thereby, terminates the connection between the output of the first receiver 20 and the input of the first sender 21.

When the relay control unit 18 receives, from the first electronic device 3, an evaluation sending notice in which the sending destination is another second electronic device 4, the relay control unit 18 sets the second communicator 16 to a relay operation mode. The relay operation mode is an operation mode in which the evaluation signal sent to another second electronic device 4 that is the sending destination (that is, the target device) is relayed and is sent to the other second electronic device 4 after the receipt of the evaluation sending notice in which the sending destination is the other second electronic device 4 and the reply signal from the other second electronic device 4 is relayed and is sent to the first electronic device 3.

In the embodiment, for example, when the relay control unit 18 receives the evaluation sending notice in which the sending destination is another second electronic device 4, the relay control unit 18 instructs the second communicator 16 to connect the output of the first receiver 20 to the input of the second sender 23 and to connect the output of the second receiver 22 to the input of the first sender 21, and thereby, sets the second communicator 16 to the relay operation mode. Further, for example, after a predetermined time lapses from the setting of the second communicator 16 to the relay operation mode, the relay control unit 18 instructs the second communicator 16 to terminate the relay operation mode, and thereby, terminates the connection between the output of the first receiver 20 and the input of the second sender 23 and the connection between the output of the second receiver 22 and the input of the first sender 21.

The in-vehicle communication system 2 having the above configuration can collectively evaluate the transmission quality of the whole of the communication transmission paths included from the first electronic device 3 to the second electronic device 4 that is the target device, and therefore, can efficiently evaluate the transmission quality of the communication transmission path.

Further, the in-vehicle communication system 2 evaluates the transmission quality by comparing the number of test signals included in the evaluation signal and the number of test signals included in the reply signal, and therefore, can evaluate the transmission quality of the communication transmission path by a simple process.

Further, the in-vehicle communication system 2 sequentially evaluates the transmission quality along the communication route, while deciding the second electronic device 4 as the target device in the order from the farthest second electronic device 4, and therefore, by comparing the results of the evaluations to each other, can easily determine whether the transmission quality of each communication transmission path 5 included in the communication route is high or low.

Figure 4:
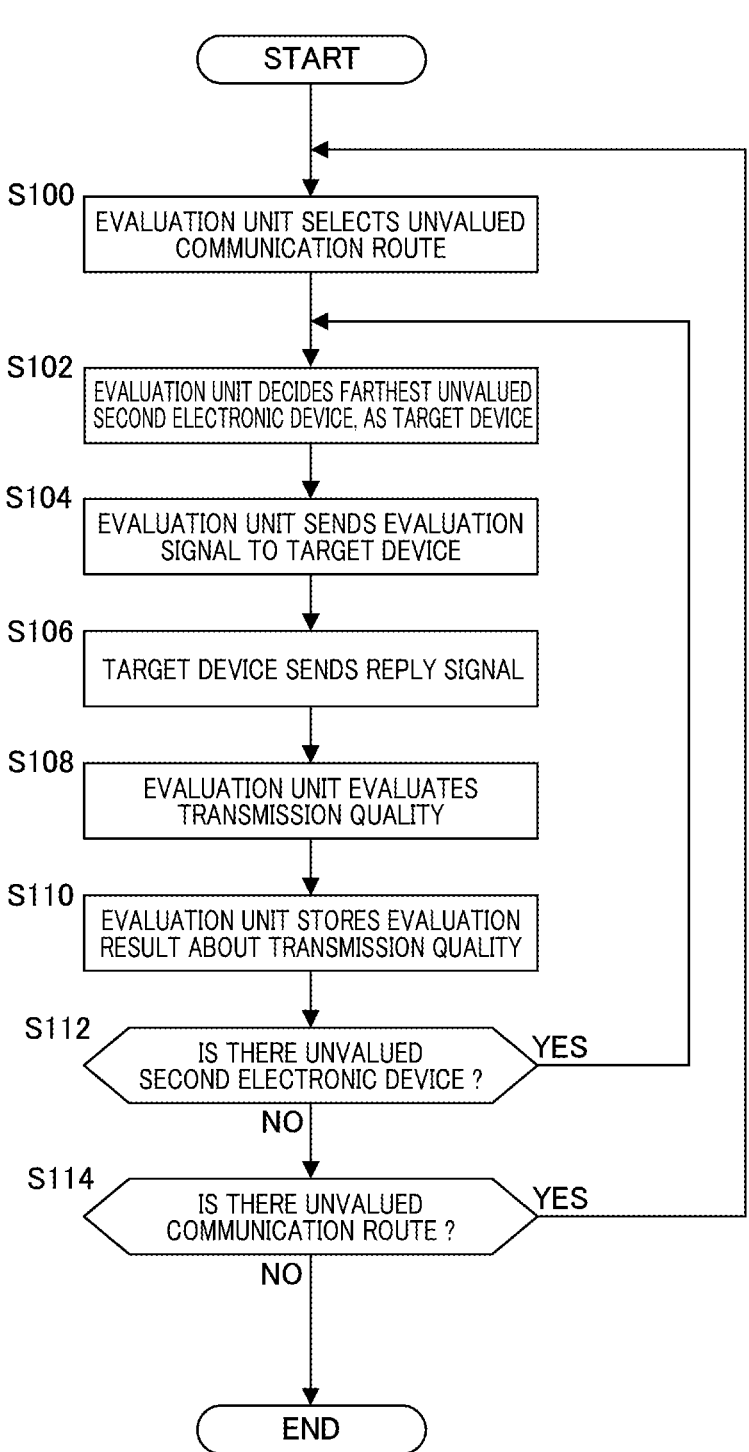
FIG. 4 is a flowchart showing a procedure of a process relevant to the evaluation of a transmission quality in the in-vehicle communication system.

Next, a procedure of the evaluation of the transmission quality in the in-vehicle communication system 2 will be described. FIG. 4 is a flowchart showing a procedure of a process relevant to the evaluation of the transmission quality in the in-vehicle communication system 2. For example, the process in FIG. 4 can be started at the time when a previously set condition is satisfied, as exemplified by the time when the drive device of the vehicle 1 is turned on or the time when the drive device of the vehicle 1 is turned off. In FIG. 4, it is assumed that the first electronic device 3 and all second electronic devices 4 each have been activated to start to operate.

When the process is started, from the first electronic device 3 to the second electronic devices 4 located at the respective ends of the communication network, the evaluation unit 11 selects a communication route (referred to as an unvalued communication route, hereinafter) for which the evaluation of the transmission quality has not been performed yet (S100). Next, from second electronic devices 4 (referred to as unvalued second electronic devices, hereinafter) that are included in the selected communication route and that have not been decided yet as the target device, the evaluation unit 11 decides the second electronic device 4 farthest from the first electronic device 3, as the target device (S102). Then, the evaluation unit 11 sends the evaluation signal to the second electronic device 4 that is the above decided target device (S104).

The second communicator 16 of the second electronic device 4 that is the target device receives the above evaluation signal from the first electronic device 3, and folds back the propagation direction of the evaluation signal to send it back to the first electronic device 3 (S106). Next, the evaluation unit 11 of the first electronic device 3 receives the reply signal from the second electronic device 4 that is the above target device, and evaluates the transmission quality of the communication transmission path 5 from the first electronic device 3 to the second electronic device 4 that is the above target device, by comparing the above sent evaluated signal and the above received reply signal (S108).

Then, the evaluation unit 11 stores the evaluation result 12 about the above transmission quality, in the first memory 7, in association with the second electronic device 4 that is the above target device (S110). The evaluation signal is formed from the array of a predetermined number of test signals as described above, and in step S110, as the evaluation result 12 about the transmission quality, the evaluation unit 11 stores the number of test signals included in the evaluation signal and the number of test signals included in the replay signal, in the first memory 7, in association with the second electronic device 4 that is the target device.

Next, the evaluation unit 11 determines whether there is an unvalued second electronic device 4 in the above selected communication route (S112). When there is an unvalued second electronic device 4 in the above selected communication route (S112, YES), the evaluation unit 11 returns to step S102 and repeats the process.

On the other hand, when there is no unvalued second electronic device 4 in the above selected communication route in step S112 (S112, NO), the evaluation unit 11 determines whether there is a communication route (referred to as an unvalued communication route, hereinafter) for which the evaluation of the transmission quality has not been performed yet (S114). When there is an unvalued communication route (S114, YES), the evaluation unit 11 returns to step S100 and repeats the process. On the other hand, when there is no unvalued communication route (S114, NO), the evaluation unit 11 ends the process.

The present invention is not limited to the configuration of the above embodiment, and can be carried out as various aspect, without departing from the spirit.

The above-described embodiment supports the following configurations.

(Configuration 1) an in-vehicle communication system including a plurality of communication transmission paths equipped in a vehicle, a first electronic device, and a plurality of second electronic devices communicably connected with the first electronic device by the communication transmission paths, wherein: each of the second electronic devices is communicably connected directly with the first electronic device by one of the communication transmission paths, or is communicably connected indirectly with the first electronic device through some of the communication transmission paths and another of the second electronic devices; the first electronic device includes an evaluation unit configured to send a predetermined evaluation signal to a target device, to receive a reply signal, and to evaluate a transmission quality of one or some of the communication transmission paths, the target device being one of the second electronic devices, the reply signal being sent back by the target device in response to receipt of the evaluation signal, the one or some of the communication transmission paths being provided from the first electronic device to the target device; each of the second electronic devices includes a communicator configured to fold back a propagation direction of the evaluated signal received as the target device and send the evaluated signal as the reply signal to the first electronic device; and the evaluation unit of the first electronic device stores an evaluation result about the transmission quality, in association with the second electronic device that is the target device.

According to the in-vehicle communication system in Configuration 1, it is possible to collectively evaluate the transmission quality of the whole of the communication transmission paths included from the first electronic device to the second electronic device that is the target device, and therefore, it is possible to efficiently evaluate the transmission quality of the communication transmission path.

(Configuration 2) the in-vehicle communication system according to Configuration 1, wherein: the evaluation signal is formed from an array of a predetermined number of test signals; and the evaluation unit stores the number of the test signals included in the evaluation signal and the number of test signals included in the reply signal, as the evaluation result about the transmission quality.

According to the in-vehicle communication system in Configuration 2, it is possible to evaluate the transmission quality of the communication transmission path by a simple process.

(Configuration 3) the in-vehicle communication system according to Configuration 1 or 2, wherein: the communication transmission paths, the first electronic device and the plurality of second electronic devices constitute a communication network, the first electronic device and the plurality of second electronic devices being connected with each other by the communication transmission paths; and the evaluation unit of the first electronic device evaluates the transmission quality along a communication route from the first electronic device to the second electronic device at an end of the communication network, while sequentially adopting, as the target device, each second electronic device from the second electronic device at the end to the second electronic device closest to the first electronic device.

According to the in-vehicle communication system in Configuration 3, by comparing the results of the sequentially performed evaluations to each other, it is possible to easily determine whether the transmission quality of each communication transmission path included in the communication route is high or low.

(Configuration 4) the in-vehicle communication system according to any one of Configurations 1 to 3, wherein the communicator of each of the second electronic devices relays the evaluation signal sent for another of the second electronic devices, to send the evaluation signal to the other of the second electronic devices, and relays the reply signal from the other of the second electronic devices, to send the reply signal to the first electronic device, the other of the second electronic devices being the target device.

According to the in-vehicle communication system in Configuration 4, it is possible to efficiently evaluate the transmission quality of the communication transmission path, even in the case of a communication network in which second electronic devices are connected as multiple stages.

(Configuration 5) the in-vehicle communication system according to Configuration 1 or 2, wherein: the first electronic device and the plurality of second electronic devices form a tree structure in which the first electronic device is a root, in which each of the second electronic devices is a node or a leaf, and in which each of the communication transmission paths is a branch; and the evaluation unit of the first electronic device evaluates the transmission quality, from the second electronic device that is the leaf, along the communication transmission path that is the branch, while sequentially adopting, as the target device, the second electronic device that is the node closer to the first electronic device.

According to the in-vehicle communication system in Configuration 5, it is possible to efficiently evaluate the transmission quality of the communication transmission path, even in the case of a communication network having a tree structure in which second electronic devices are connected as multiple stages.

(Configuration 6) the in-vehicle communication system according to any one of Configurations 1 to 4, wherein the evaluation unit of the first electronic device evaluates the transmission quality both when a drive device of the vehicle is in an on-state and when the drive device of the vehicle is in an off-state, and stores evaluations of the transmission quality both in the on-state and in the off-state.

According to the in-vehicle communication system in Configuration 6, it is possible to easily and efficiently know the influence that is given on the transmission quality of the communication transmission path by the drive device, which can be a principal noise source in the vehicle.

(Configuration 7) a transmission path evaluation method in an in-vehicle communication system including a plurality of communication transmission paths equipped in a vehicle, a first electronic device, and a plurality of second electronic devices communicably connected with the first electronic device by the communication transmission paths, wherein: each of the second electronic devices is communicably connected directly with the first electronic device by one of the communication transmission paths, or is communicably connected indirectly with the first electronic device through some of the communication transmission paths and another of the second electronic devices; and the transmission path evaluation method includes a step of sending, by an evaluation unit of the first electronic device, a predetermined evaluation signal to a target device that is one of the second electronic devices, a step of receiving, by a communicator of the second electronic device that is the target device, the evaluation signal from the first electronic device, and folding back a propagation direction of the evaluated signal and sending the evaluated signal back as a reply signal to the first electronic device, a step of receiving, by the evaluation unit of the first electronic device, the reply signal sent back by the second electronic device that is the target device, and evaluating a transmission quality of one or some of the communication transmission paths, the one or some of the communication transmission paths being provided from the first electronic device to the target device, and a step of storing, by the evaluation unit of the first electronic device, an evaluation result about the transmission quality, in association with the second electronic device that is the target device.

According to the transmission path evaluation method in Configuration 7, it is possible to collectively evaluate the transmission quality of the whole of the communication transmission paths included from the first electronic device to the second electronic device that is the target device, and therefore, it is possible to efficiently evaluate the transmission quality of the communication transmission path.

(Configuration 8) the transmission path evaluation method according to Configuration 7, wherein: the evaluation signal is formed from an array of a predetermined number of test signals; and in the step of storing, the evaluation unit stores the number of the test signals included in the evaluation signal and the number of the test signals included in the reply signal, as the evaluation result about the transmission quality.

According to the transmission path evaluation method in Configuration 8, it is possible to evaluate the transmission quality of the communication transmission path by a simple process.

REFERENCE SIGNS LIST

1 . . . vehicle, 2 . . . in-vehicle communication system, 3 . . . first electronic device, 4, 4a, 4b, 4c, 4d, 4e, 4f, 4g, 4h, 4i, 4j, 4k . . . second electronic device, 5, 5a, 5b, 5c, 5d, 5e, 5f, 5g, 5h, 5i, 5j, 5k . . . communication transmission path, 6 . . . first processor, 7 . . . first memory, 8 . . . first communicator, 9 . . . sending unit, 10 . . . receiving unit, 11 . . . evaluation unit, 12 . . . evaluation result, 13 . . . first evaluation program, 14 . . . second processor, 15 . . . second memory, 16 . . . second communicator, 17 . . . folding-back control unit, 18 . . . relay control unit, 19 . . . second evaluation program, 20 . . . first receiver, 21 . . . first sender, 22 . . . second receiver, 23 . . . second sender

What is claimed is:

1. An in-vehicle communication system including a plurality of communication transmission paths equipped in a vehicle, a first electronic device, and a plurality of second electronic devices communicably connected with the first electronic device by the communication transmission paths, wherein:

each of the second electronic devices is communicably connected directly with the first electronic device by one of the communication transmission paths, or is communicably connected indirectly with the first electronic device through some of the communication transmission paths and another of the second electronic devices;

the first electronic device includes a first processor configured to send a predetermined evaluation signal to a target device, to receive a reply signal, and to evaluate a transmission quality of one or some of the communication transmission paths, the target device being one of the second electronic devices, the reply signal being sent back by the target device in response to receipt of the evaluation signal, the one or some of the communication transmission paths being provided from the first electronic device to the target device;

each of the second electronic devices includes a transceiver configured to fold back a propagation direction of the evaluated signal received as the target device and send the evaluated signal as the reply signal to the first electronic device;

the first processor stores an evaluation result about the transmission quality, in association with the second electronic device that is the target device;

the communication transmission paths, the first electronic device and the plurality of second electronic devices constitute a communication network, the first electronic device and the plurality of second electronic devices being connected with each other by the communication transmission paths; and the first processor evaluates the transmission quality along a communication route from the first electronic device to the second electronic device at an end of the communication network, while sequentially adopting, as the target device, each second electronic device from the second electronic device at the end to the second electronic device closest to the first electronic device, and by comparing evaluation results with each other, determines whether the transmission quality of each communication transmission path included in the communication route is high or low.

2. The in-vehicle communication system according to claim 1, wherein:

the evaluation signal is formed from an array of a predetermined number of test signals; and the first processor stores the number of the test signals included in the evaluation signal and the number of the test signals included in the reply signal, as the evaluation result about the transmission quality.

3. The in-vehicle communication system according to claim 1, wherein the transceiver relays the evaluation signal sent for another of the second electronic devices, to send the evaluation signal to the other of the second electronic devices, and relays the reply signal from the other of the second electronic devices, to send the reply signal to the first electronic device, the other of the second electronic devices being the target device.

4. The in-vehicle communication system according to claim 1, wherein:

the first electronic device and the plurality of second electronic devices form a tree structure in which the first electronic device is a root, in which each of the second electronic devices is a node or a leaf, and in which each of the communication transmission paths is a branch; and the first processor evaluates the transmission quality, from the second electronic device that is the leaf, along the communication transmission path that is the branch, while sequentially adopting, as the target device, the second electronic device that is the node closer to the first electronic device.

5. The in-vehicle communication system according to claim 1, wherein the first processor evaluates the transmission quality both when a drive device of the vehicle is in an on-state and when the drive device of the vehicle is in an off-state, and stores evaluations of the transmission quality both in the on-state and in the off-state.

6. A transmission path evaluation method in an in-vehicle communication system including a plurality of communication transmission paths equipped in a vehicle, a first electronic device, and a plurality of second electronic devices communicably connected with the first electronic device by the communication transmission paths, wherein:

each of the second electronic devices is communicably connected directly with the first electronic device by one of the communication transmission paths, or is communicably connected indirectly with the first electronic device through some of the communication transmission paths and another of the second electronic devices; and the transmission path evaluation method includes a step of sending, by a first processor of the first electronic device, a predetermined evaluation signal to a target device that is one of the second electronic devices, a step of receiving, by a transceiver of the second electronic device that is the target device, the evaluation signal from the first electronic device, and folding back a propagation direction of the evaluated signal and sending the evaluated signal back as a reply signal to the first electronic device, a step of receiving, by the first processor, the reply signal sent back by the second electronic device that is the target device, and evaluating a transmission quality of one or some of the communication transmission paths, the one or some of the communication transmission paths being provided from the first electronic device to the target device, and a step of storing, by the first processor, an evaluation result about the transmission quality, in association with the second electronic device that is the target device, wherein the communication transmission paths, the first electronic device and the plurality of second electronic devices constitute a communication network, the first electronic device and the plurality of second electronic devices being connected with each other by the communication transmission paths; and the first processor evaluates the transmission quality along a communication route from the first electronic device to the second electronic device at an end of the communication network, while sequentially adopting, as the target device, each second electronic device from the second electronic device at the end to the second electronic device closest to the first electronic device, and by comparing evaluation results with each other, determines whether the transmission quality of each communication transmission path included in the communication route is high or low.

7. The transmission path evaluation method according to claim 6, wherein:

the evaluation signal is formed from an array of a predetermined number of test signals; and in the step of storing, the first processor stores the number of the test signals included in the evaluation signal and the number of the test signals included in the reply signal, as the evaluation result about the transmission quality.

* * * * *